United States Patent [19]

Smit et al.

[11] Patent Number: 4,503,978

[45] Date of Patent: Mar. 12, 1985

[54] SUPPORT FOR CYLINDRICAL OBJECTS SUCH AS ROLLED COILS

[75] Inventors: Arie Smit, Schoorl; Johannes W. Marcus, Beverwijk, both of Netherlands

[73] Assignee: Estel Hoogovens B.V., Ijmuiden, Netherlands

[21] Appl. No.: 415,940

[22] Filed: Sep. 8, 1982

[30] Foreign Application Priority Data

Sep. 24, 1981 [NL] Netherlands .................... 8104390

[51] Int. Cl.³ .............................................. A47F 7/00
[52] U.S. Cl. ...................................... 211/13; 211/74; 211/60.1
[58] Field of Search ................ 211/13, 60 R, 49.5, 211/74; 410/49

[56] References Cited

U.S. PATENT DOCUMENTS

| 458,515 | 8/1891 | Boyle | 211/13 X |
|---|---|---|---|
| 2,766,660 | 10/1956 | Laddon et al. | 211/13 X |
| 3,752,086 | 8/1973 | Smith | 211/49 X |
| 4,190,165 | 2/1980 | Collins | 211/60 R |
| 4,241,810 | 12/1980 | Newlon | 410/49 X |

FOREIGN PATENT DOCUMENTS 70341 12/1949 Denmark ............................ 211/13

Primary Examiner—Ramon S. Britts
Assistant Examiner—Blair M. Johnson
Attorney, Agent, or Firm—Stevens, Davis, Miller & Mosher

[57] ABSTRACT

Cylindrical objects such as rolled coils are frequently stored supported on rows of supporting members which rows have along their length a regularly repeating hill and valley profile. With increasing coil size and weight the supporting members tend increasingly to become damaged and stacks of several layers of coils become less stable. To ameliorate these problems the supporting members are made of a resiliently deformable material such as a low density polyethylene and are so shaped when not deformed that the hill and valley profile has a series of upwardly projecting ridges, sloping regions extending downwardly away from each side of each ridge, and substantially horizontal regions between the sloping regions. Preferably each supporting member has one centrally disposed ridge, a sloping region on each side of the ridge, and half of a horizontal region at each end.

5 Claims, 5 Drawing Figures

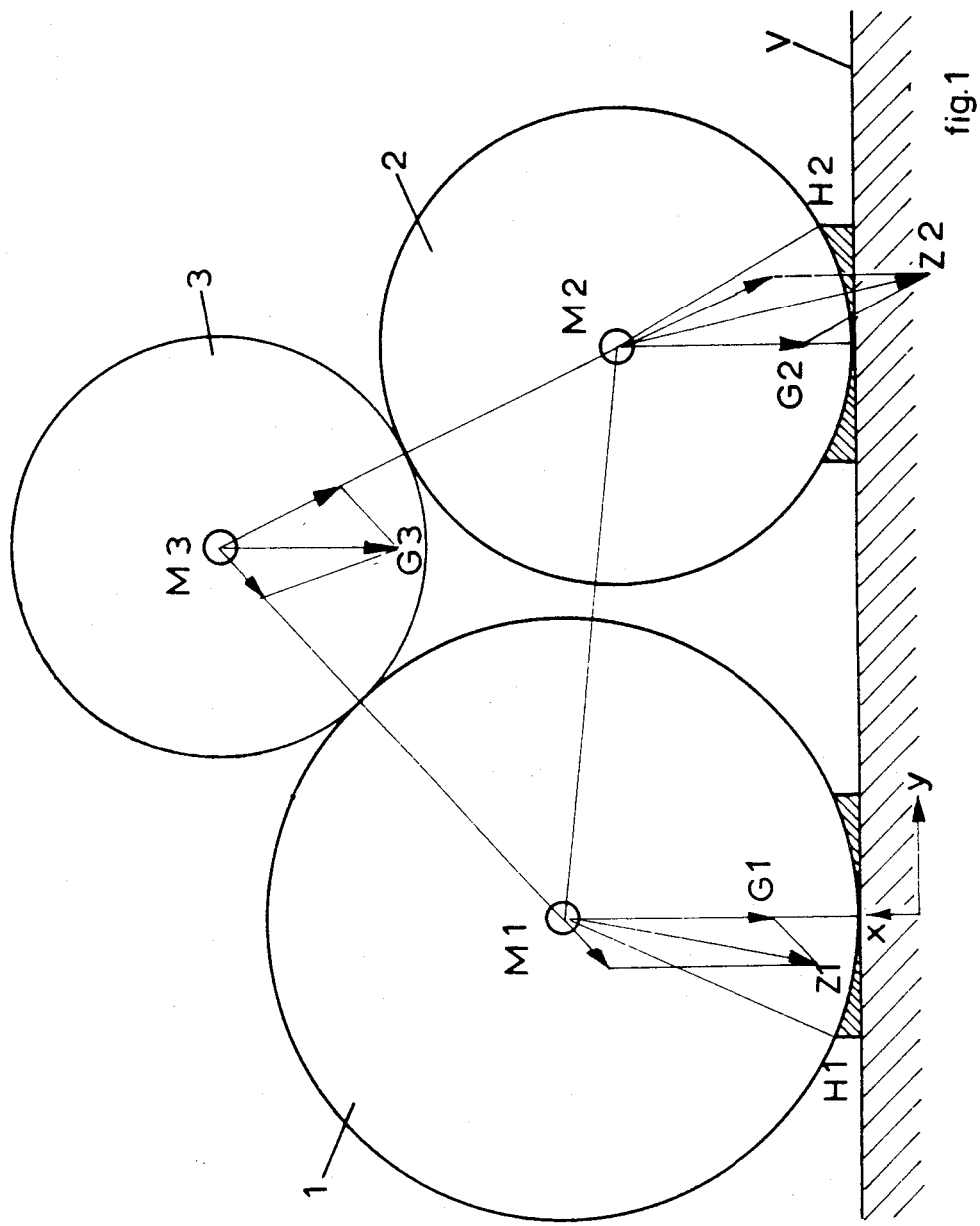

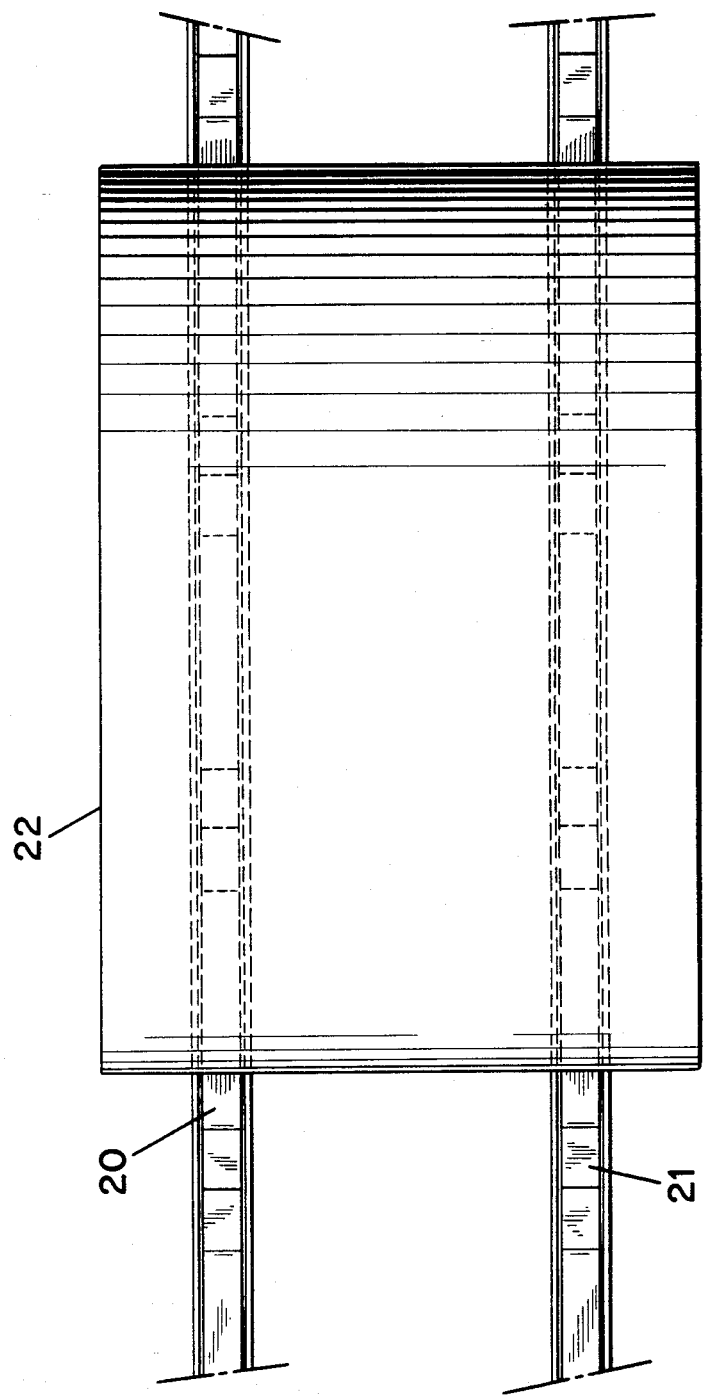

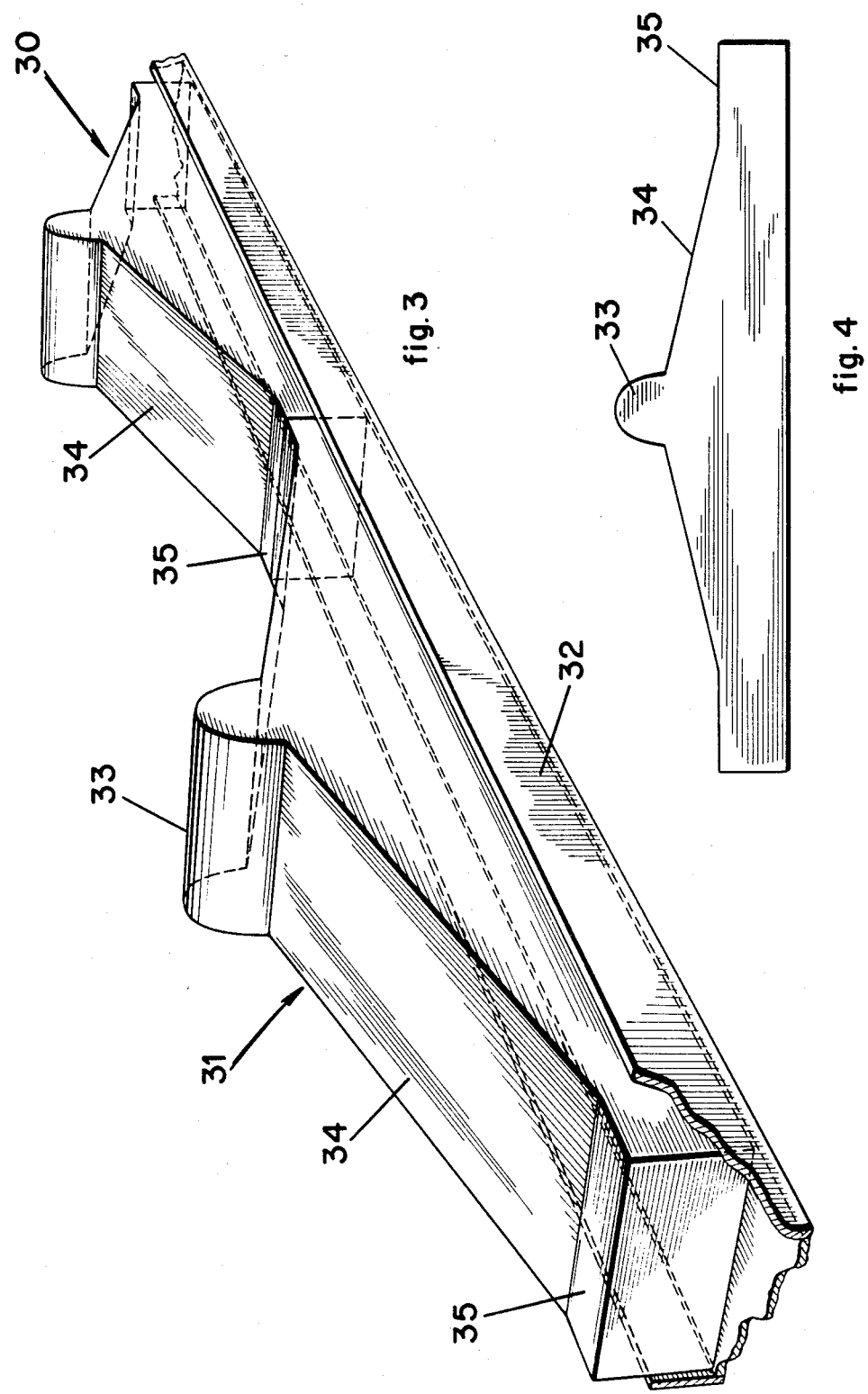

SUPPORT FOR CYLINDRICAL OBJECTS SUCH AS ROLLED COILS

BACKGROUND OF THE INVENTION

1. Field of the Invention

The invention relates to a support for cylindrical objects, such as rolled steel coils, on the floor of a store.

2. Description of the Prior Art

Such a support is familiar in the relevant industries and in practice is referred to as a "coil cradle". Two rows of supporting members each comprises a number of identical generally wedge-shaped wooden blocks having in side-view the shape of a right-angled trapezium and placed back-to-back against one another in a low U-shape channel lying on the floor. The channel holds the wedges together so that the upper surface of each row has a saw-tooth or "hill and valley" shape. The pitch between the tops can be, for example, 40 cm, so that each wedge shaped block is 20 cm long. The advantage of these wood blocks is that they are fairly easy to manufacture, but they have, in spite of the use of woods such as merbau and mercanti, the disadvantages of a lack of durability under persistent deformation and a liability to splitting and splintering, and even pulverisation, under the generally heavy loads occurring on deposition and removal of the coils.

The trend towards greater coil dimensions and weights continues, so that for both manufactuer and user of coils of strip it is becoming more important to keep the consequences for the supports in mind. In particular larger coil diameters will require greater wedge heights and separations, while greater coil weights make it necessary to reduce the number of layers of coils stacked one above another. With the existing coil cradles, it is not permitted to exceed a certain maximum stacking, because the resulting force on the end coil in the lowest layer of a stack can be too great for the angle of slope of the wedges used, resulting in an unstable stack.

An unstable stack involves unacceptable risks for people working in the store, while the movement and collapse of unstably stacked coils involves financial loss due to rejection of damaged products.

SUMMARY OF THE INVENTION

One object of the invention is to provide a support of the hill-and-valley type which is more durable and is less prone to damage on the deposition and removal of rolled coils etc. than the present wooden coil cradles.

Another object of the invention is to provide a coil cradle which allows the safe stacking of larger and heavier coils than has been practical heretofore in more than one layer.

Yet another object of the invention is to produce a coil cradle which is resistant to the high surface stresses which occur.

In support of the present invention, the supporting members forming each row are resiliently deformable and so shaped that when no load is applied to them each row has a regularly repeating profile having a series of upwardly projecting ridges, sloping regions extending downwardly away from each side of each ridge and substantially horizontal regions between the sloping regions extending from adjacent ridges.

Preferably each supporting member is one repeating unit long, with a central ridge, a sloping portion on each side of the ridge, and a half-size horizontal region at each end.

Preferably each supporting member is so shaped that the horizontal region at each end constitutes about 1/6 of its length (so that the complete horizontal region in each unit of the profile is about ⅓ of the length of the unit), the slope angle is about 15° and the slope angle of the ridge sides at the foot of the ridge is about 65°. The supporting member is preferably manufactured from a plastics material of the low-density polyethylene type.

BRIEF INTRODUCTION TO THE DRAWINGS

An embodiment of the invention, given by way of example will now be described by way of non-limitative example with reference to the drawings, in which:

FIG. 1 shows schematically a stable stack of three coils;

FIG. 2 shows a coil placed on two rows of supporting members viewed from the top;

FIG. 3 shows in perspective a pair of supporting members embodying the present invention set up in a U-shaped channel;

FIG. 4 shows a single supporting member of FIG. 3 in side view on a smaller scale.

DESCRIPTION OF THE PREFERRED EMBODIMENT

Figure 5:
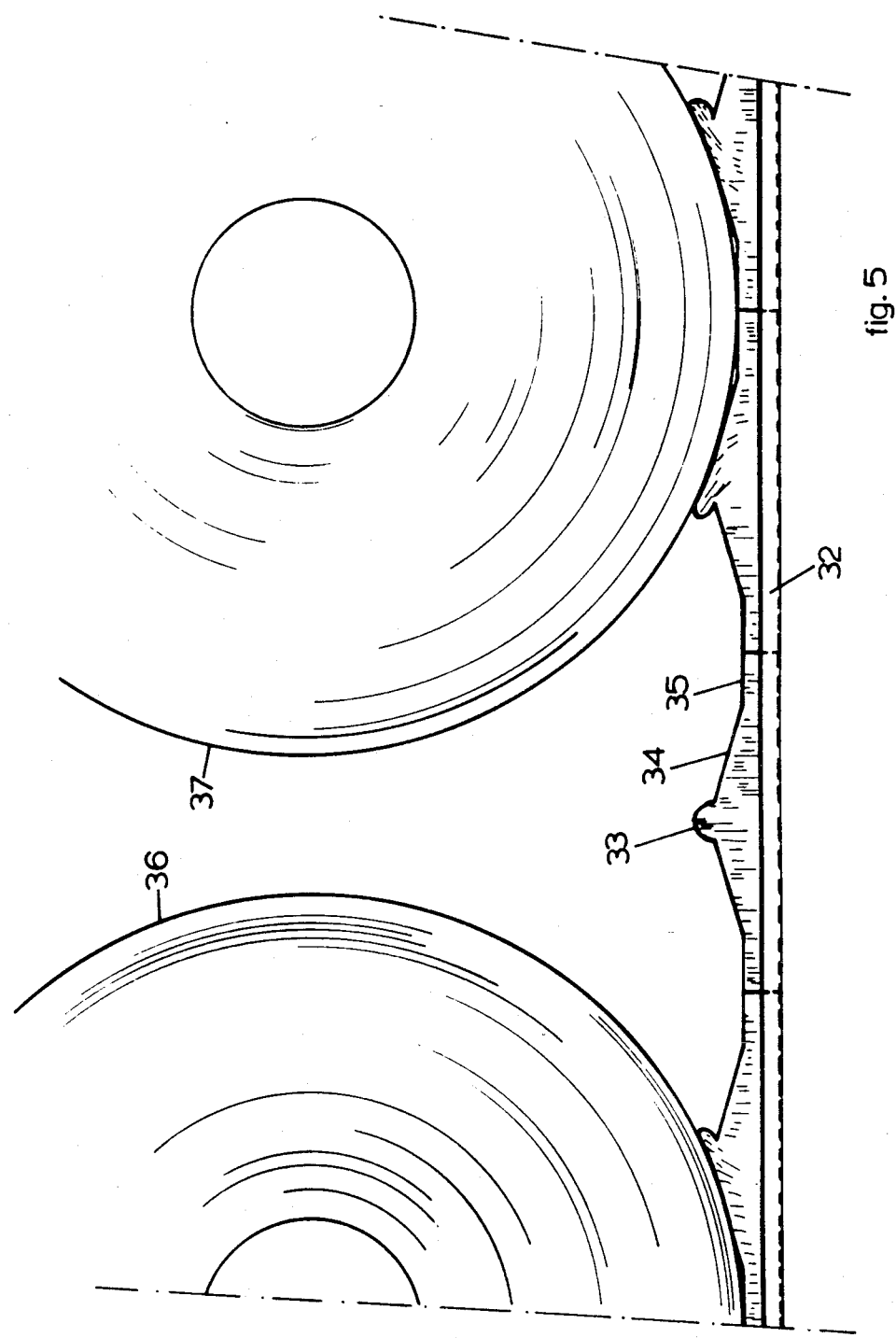
FIG. 5 shows in side-view several supporting members of FIG. 3 set up in a channel and two coils resting on them.

In FIG. 1, two steel coils 1 and 2 are shown supported on a horizontal floor V without touching each other, while a third coil 3 rests on both of them. The diameters of the three coils are different. M1,M2 and M3 are the respective axes of these coils; the vectors G1,G2,G3 respresent their weights. It is assumed that there is no frictional force components between the coil 1 and the coil 3 or between the coil 2 and the coil 3.

By resolving the vector G3 (the weight of the coil 3) in the directions M3-M1 and M3-M2 and adding these components to the coil weights G1 and G2, it can be seen that there are lateral component forces Z1 and Z2 respectively acting on the coil 1 and the coil 2, and the horizontal components of Z1 and Z2 if no steps are taken to prevent it, will cause the coils 1 and 2 to roll apart. Both coils 1 and 2 are supported, however, at their lower sides at H1 and H2. So long as the resultants Z1 and Z2 lie respectively within the angle H1-M1-G1 and H2-M2-G2 the stack is stable.

FIG. 2 is a top view of two rows 20,21 of supporting members with a single coil 22 placed on them. Depending on the axial extent of the coil 22 the rows 20 and 21 will normally have a mutual separation of between 500 mm and 1550 mm.

FIG. 3 shows in perspective a pair of adjacent supporting members 30,31 in accordance with the present invention. These members are held end-to-end with many other identical members in a low U-shaped channel 32 resting on the floor of the storage space. A part of one side wall of the channel shown broken away. Thus a row of the supporting members is formed. The support of the invention has at least two such rows, parallel to each other.

Each supporting member is symmetrical and has an upper surface consisting of a central upwardly projecting round-topped ridge 33, a slope 34 extending downwardly away from the ridge 33 at each side thereof. The slopes 34 at their lower ends join horizontal end portions 35 of the supporting member.

Each member is manufactured from a plastics of a low-density polyethylene type, which has resilient properties and after deformation by a load returns to its original shape. To help with the re-use of plastics and to keep down costs, old material can be used after being ground and moulded. The modulus of elasticity E of the resultant material is about 240 N/mm$^2$ in this embodiment.

In a specific example of a supporting member of the shape shown in FIG. 4, had the following dimensions: pitch—590 mm between the ridges (=member length), ridge height—160 mm (above bottom surface), angle to horizontal of slope 34—about 15°, angle to horizontal of each ridge side wall at the foot of the ridge 33—about 65°, length of each horizontal region 35—about 1/6 of total member length, length of ridge (i.e. dimension in the longitudinal direction of the member)—70 mm, width of the member—120 mm, thickness (height) of member at the end portions 35—95 mm, cross-sectional dimensions of channel 32—70×140 mm. Such a support was found suitable for 3 to 16 ton coils of diameters varying from 700 to 1600 mm.

The above mentioned pitch of 590 mm was not arbitrarily chosen, but was established experimentally as the dimension at which a coil of the most common coil diameter (1000 mm) just rests with contact at both sides against the ridges (and thus makes contact at five points). See FIG. 5 which illustrates five-point contact. It should be realised that coils of larger diameter than 1000 mm will deform the adjacent ridges to a greater or lesser degree, while coils with a smaller diameter are usually stacked in a higher layer, not in contact with the supporting members 30,31.

The minimum angle of the slope 34 for a given coil size is decisive for save stacking as explained with reference to FIG. 1. As a result of the shape shown for the members 30,31 and particularly as a result of the resilient upward projecting central ridge 33, with larger coil diameters than the size mentioned, and also with stacked loads, the ridge or ridges are pressed sideways and deformed. This effectively produces a steeper slope. The most unfavourable situation which occurs in practice, i.e. the stacking of three layers of coils of both largest diameter and weight, should be avoided, either by choice of pitch larger than the 590 mm mentioned or by stacking in only two layers.

If the coils being stored are part of a large batch, the mean time off storage of a coil on the support can be a few weeks. However, it has been found that the plastics material preferred regains its original shape almost entirely within a short time after the removal of the coil and thus of the deforming load. It has also been found that, if a large coil is positioned one pitch further away, so that the ridges are deformed in the opposite direction, this does not have a deleterious effect.

To achieve as compact an arrangement as possible of the successive supporting members 30,31 (FIG. 2) within the U-shaped channel 32, both ends of all members should be made precisely upright and square, so that no gaps occur between them.

In order to ensure a better flow of material to the angles between the ridge sides at the foot of the ridge 33 and the adjacent slopes 34 when the members are formed by pressure moulding, and also to reduce the possibility of local pressure cracking on deformation of the ridge, it is preferred to make this angle less sharp, e.g. by rounding it. The lifetime of the supporting members can be somewhat increased in this way.

What is claimed is:

1. Support for supporting cylindrical objects from rolling, having at least two parallel rows of supporting members and means to maintain said supporting members in a row, each row having a plurality of unitary supporting members lying end to end in contact with each other, each said supporting member consisting of resiliently deformable material and being so shaped that when no load is applied to the row the upper surface of each row has along its length a regularly repeating profile comprising a series of upwardly projecting ridges and, between each adjacent pair of said ridges, two sloping regions extending downwardly and towards each other from the respective ridges and a substantially horizontal region lying between the said sloping regions.

2. Support according to claim 1 in which each said supporting member extends from the mid point of one said horizontal region to the mid point of an adjacent horizontal region.

3. Support according to claim 2 in which the length of the said horizontal regions is about one-third of the total length of each repeating unit of the said profile so that the portions of the horizontal regions at each end of a said supporting member are each about one-sixth of the length of the member, the angle of slope of the said sloping regions is about 15° and the angle of slope of the ridge sides at the foot of each ridge is about 65°.

4. Support according to claim 1 wherein the said supporting members are made of a plastics material.

5. Support according to claim 4 wherein the said plastics material is low density polyethylene.

* * * * *